Figure 1:
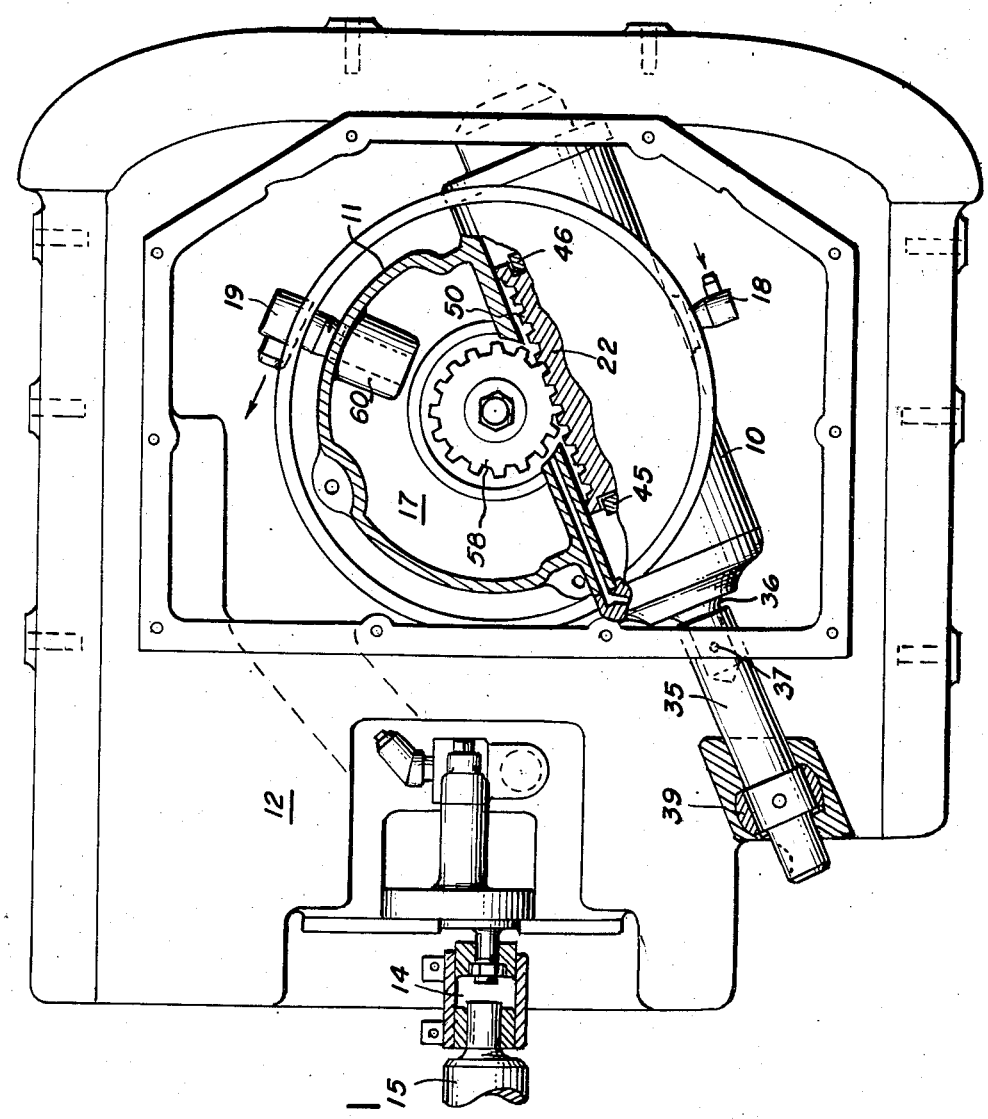

April 15, 1958 R. H. SHEPPARD 2,830,461
HYDRAULIC STEERING GEAR
Filed May 18, 1956 5 Sheets-Sheet 1

INVENTOR
RICHARD H. SHEPPARD
BY *Henry H Snelling*
ATTORNEY

April 15, 1958  R. H. SHEPPARD  2,830,461
HYDRAULIC STEERING GEAR
Filed May 18, 1956  5 Sheets-Sheet 4

INVENTOR
RICHARD H. SHEPPARD
BY Henry H. Snelling
ATTORNEY

April 15, 1958 R. H. SHEPPARD 2,830,461
HYDRAULIC STEERING GEAR
Filed May 18, 1956 5 Sheets-Sheet 5

INVENTOR
RICHARD H. SHEPPARD
BY Henry H Snelling
ATTORNEY

United States Patent Office 2,830,461
Patented Apr. 15, 1958

2,830,461

HYDRAULIC STEERING GEAR

Richard H. Sheppard, Hanover, Pa.

Application May 18, 1956, Serial No. 585,789

11 Claims. (Cl. 74—388)

This invention relates to hydraulic steering and has for its principal object the provision of an extremely compact, sturdy steering gear suitable for use on a tractor and interchangeable with a purely mechanical gear performing the same operation, being suitable for installation in the same location and secured to the same members as the mechanical gear which it replaces. In this gear the valves, whether valves, ports, or both, are built into the power piston and the steering input shaft is connected axially to the latter and may pass through it.

A feature of the invention is to provide for very high steering ratios such as 10:1, which are not only practical but are advisable, especially on such farm equipment as may require a quick turn of the machine.

By use of the present invention the operator, instead of having to throw his entire weight on one side or the other of the steering wheel, may make the turn with ease using only one hand and therefore being free to use his other hand to operate such other controls as the hydraulic levers, etc., which are usually present and necessary to operate during certain turning movements. An incidental feature of the foregoing is that the steering ratio may readily be changed whenever that be found necessary; the only alteration required being to alter the lead on the screw and the washers carried thereby, which washers are threaded on the screw for axial movement. These two washers are adjustable through a wide number of vernier changes, each washer being independently locked against rotation while shifting axially as the screw rotates in accordance with movement of the steering wheel.

A further object of the invention is to provide a hydraulic steering gear suitable for use on vehicles, particularly tractors, which gear shall have a minimum number of parts, most parts performing functions which at the present time are taken care of by a number of different mechanisms. The present device is very easy to install as the usual tank is omitted in favor of a reservoir within the hydraulic steering gear housing itself, this feature alone eliminating a number of extra hydraulic lines as the expansion tank is connected to the reservoir by a drilled passage. The present machine is exceptionally sturdy and the design of the various parts permits the use of ordinary materials processed in usual manner. In many of the parts free machining leaded steels and plain carbon steels are satisfactory. The hydraulic fluid is preferably an oil which serves to lubricate the various parts.

In the drawings:

Figure 1 is a plan view partly in horizontal section through the center line of the rotatable actuating shaft which is the screw.

Figure 2:
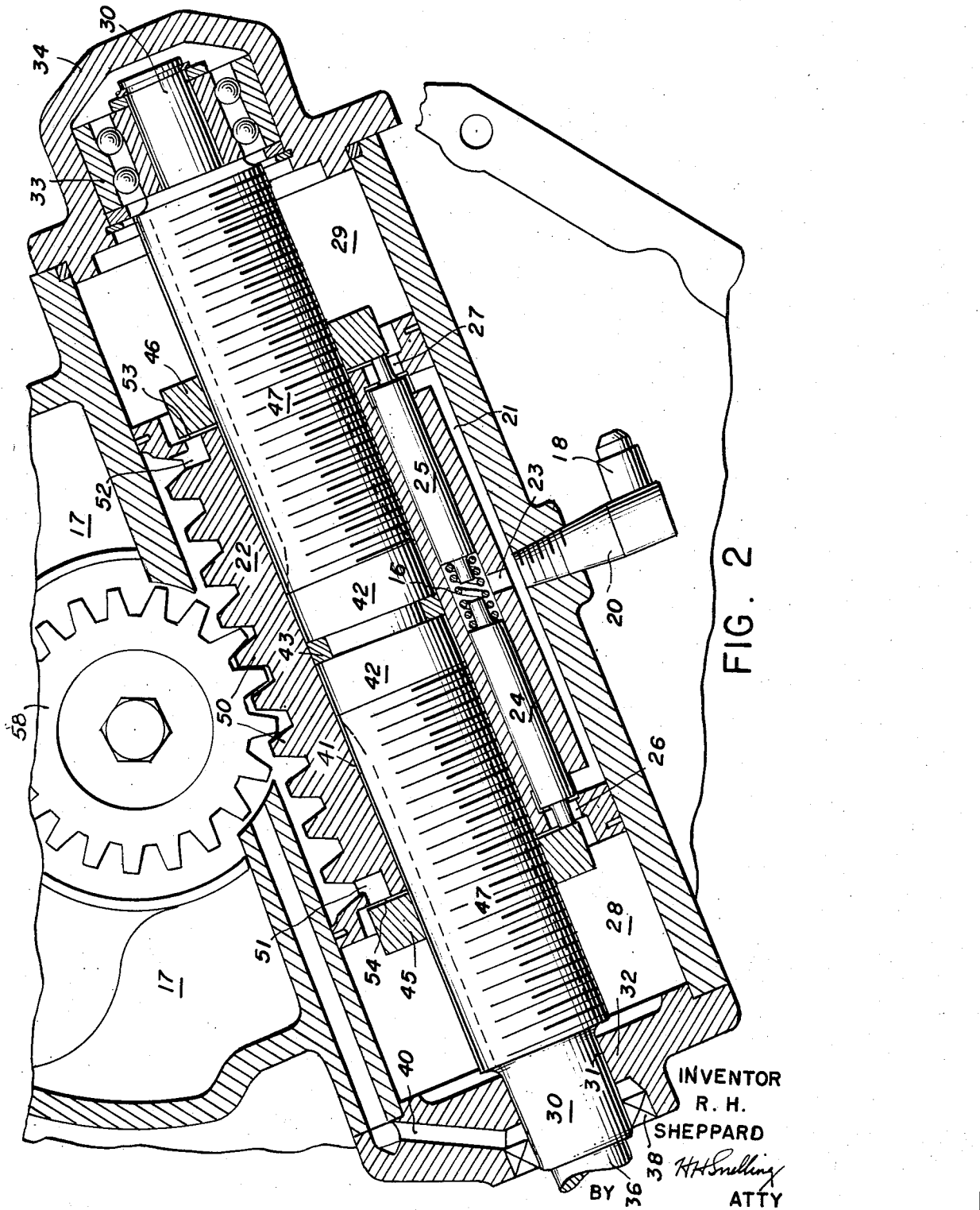
Figure 3:
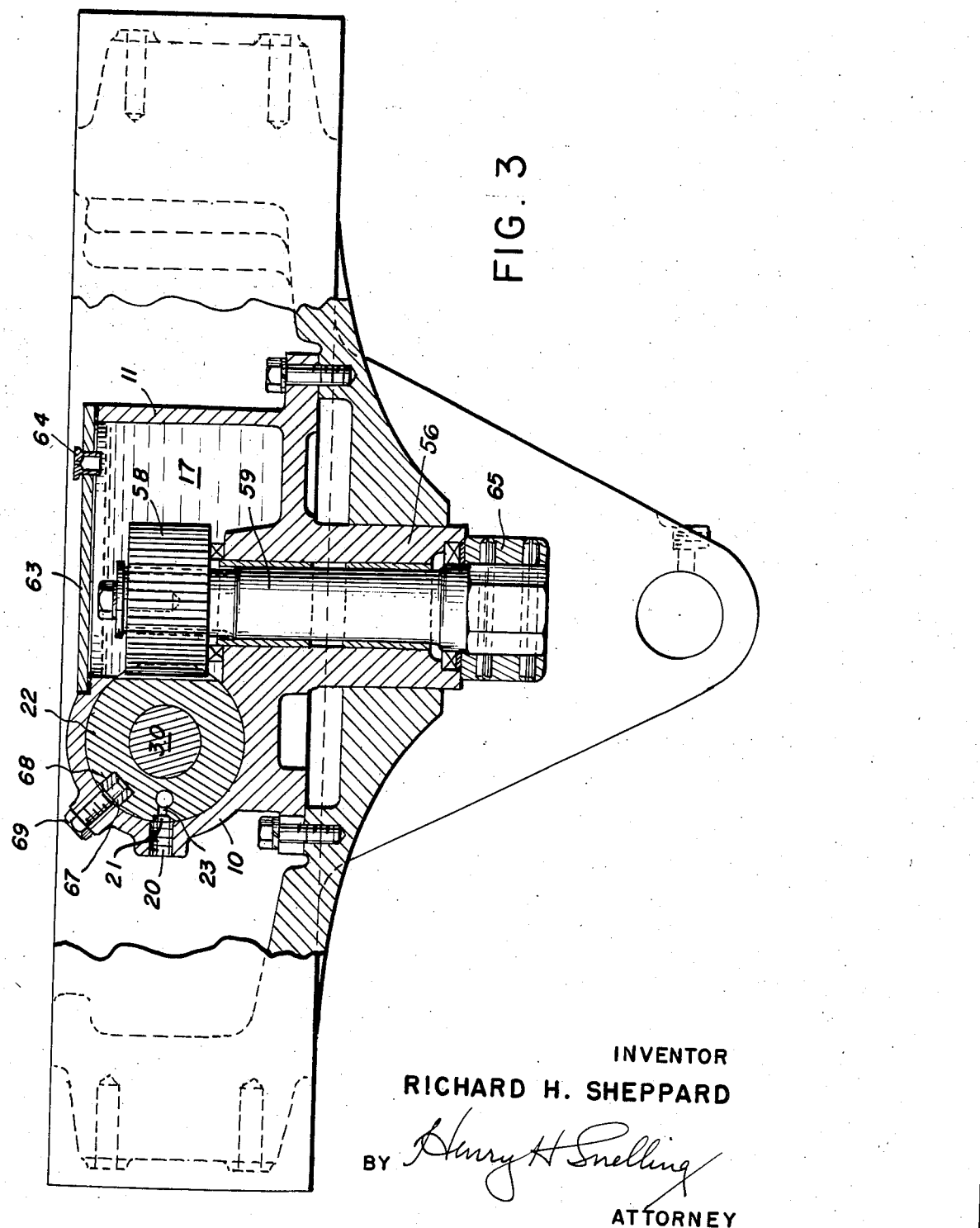
Figure 4:
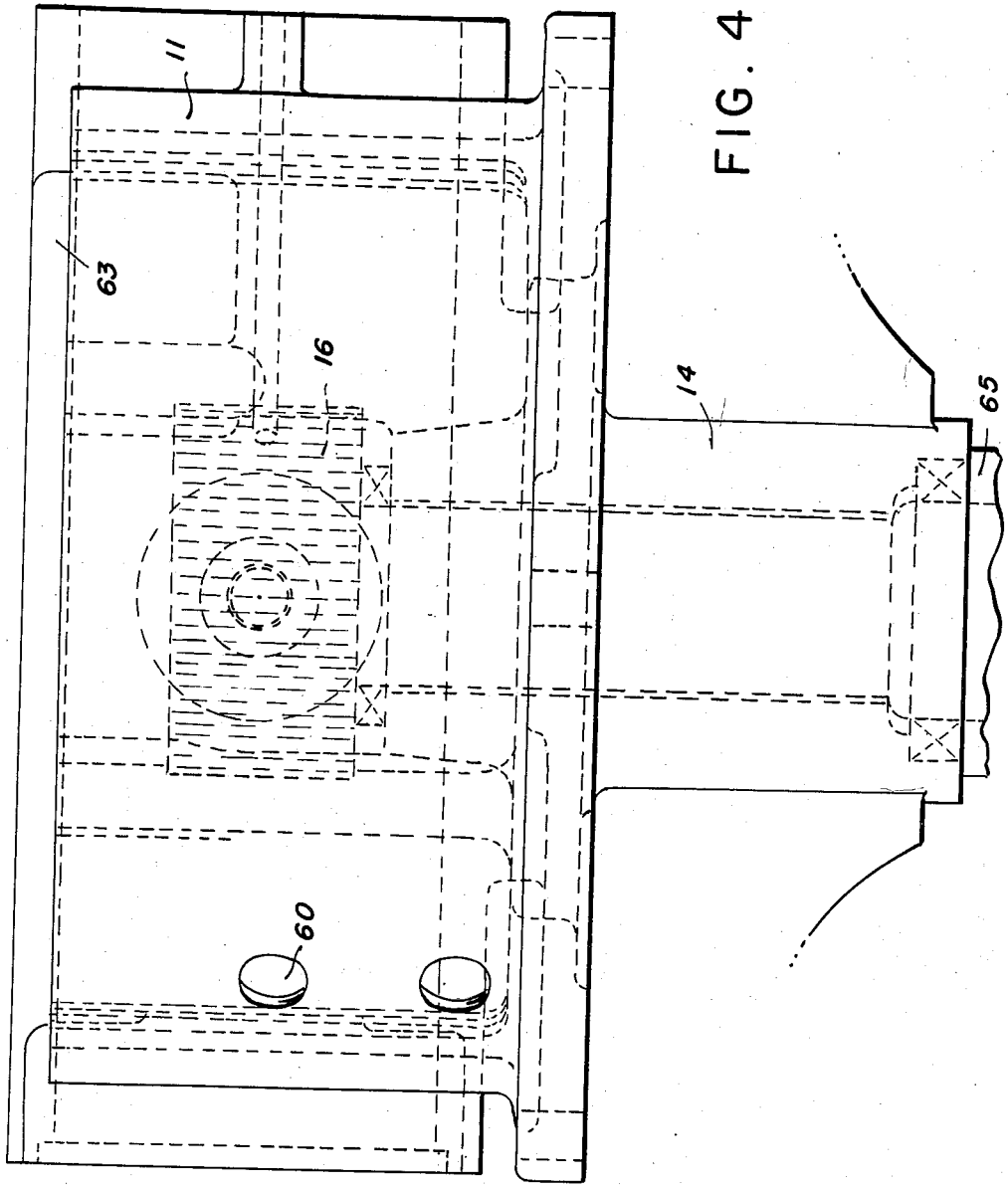
Figure 6:
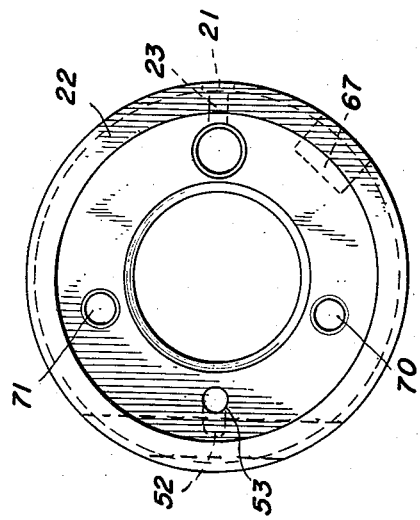
Figure 8:
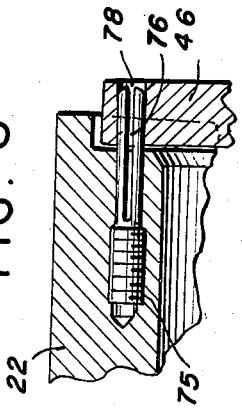
Figure 5:
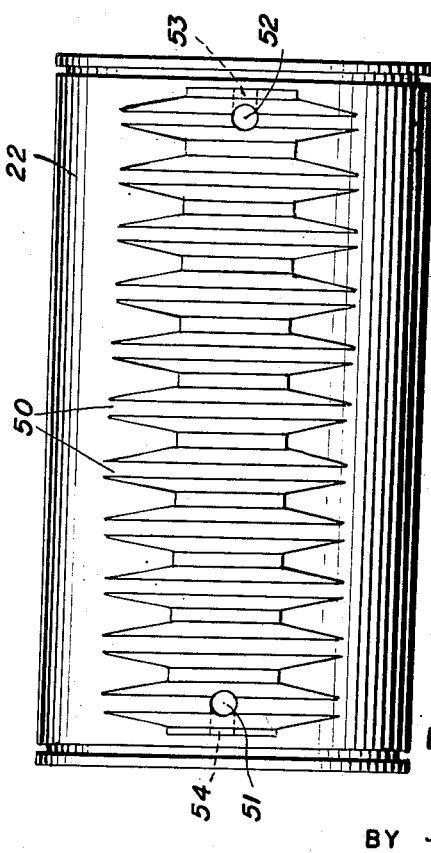
Figure 7:
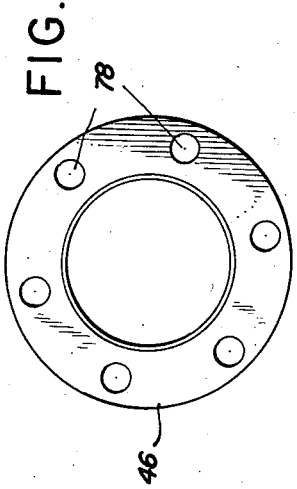

Figure 2 is a horizontal section on a larger scale.
Figure 3 is a vertical section through the power shaft.
Figure 4 is a front elevation.
Figure 5 is a side view of the piston.
Figure 6 is an end view of the piston.
Figure 7 is an end view of one of the washers.
Figure 8 is a fragmentary section through a roll pin.
The steering gear housing includes a body which includes an integral cylinder 10, an upper reservoir portion 11 and a lower cylindrical extension 56 to house the vertical power shaft 59 which carries at its top the driven pinion 58. The hydraulic oil in the reservoir 17 is circulated by means of a positive displacement pump, 12, which is coupled as at 14 to the front end 15 of the crank shaft of the vehicle and supplies oil to the fitting 18 at the bottom of the housing and withdraws oil through fitting 19 at the side of the housing. I find that a pump delivering a gallon and a half per minute at 500 R. P. M. and developing a pressure of 800 to 1200 pounds is highly suitable, the pump having an ordinary by-pass through which the fluid passes when the maximum pressure is reached, this forming no part of the present invention.

The oil entering the housing passes first through side entry bore 20 (Fig. 2), meeting groove 21 in the side of piston 22 and may pass directly through port 23 between the two valves 24 and 25 which are urged in opposite directions by a spring 16 placed between them or the fluid may pass through the groove 21 to the far ends of each of the two valves and may escape through passageways 26 and 27 to oil spaces 28 and 29 respectively.

Centrally within the cylinder portion 10 of the housing there is a rotatable actuating shaft 30 which is connected by suitable means, not shown, to the steering wheel of the vehicle so that rotation of the steering wheel will rotate shaft 30 in its bearing 31 in the cylinder head 32 and in a double row ball thrust bearing 33 in bearing cap 34, the latter positioning the shaft 30 axially. An extension shaft 35 (Fig. 1) which is rigidly secured to the end 36 of shaft 30 by a pin such as 37 is itself supported in a suitable bearing 39 so that there is little wear at bearing 31. Any oil that passes through this latter bearing is stopped by the oil seal 38 (Fig. 2) and is returned to the reservoir 17 through port 40.

The central portion 42 of the shaft 30 fits snugly within the central bore 41 of piston 22 and preferably carries an oil seal 43. On both sides of the cylindrical portion 42 the shaft 30 is provided with one-quarter pitch, 1" lead, quadruple threads and the internally threaded washers 45 and 46 move axially on these threads 47 as the shaft 30 is rotated by the vehicle driver. Each of the two threaded washers 45 and 46 is adjustably connected to the piston 22 to prevent their rotation by means later to be described and it is convenient to provide means, also to be described later, to avoid any tendency of the piston 22 itself to rotate.

On one side of piston 22 a series of rack teeth 50 is provided. Two slight horizontal holes 51 and 52 meet axially directed holes 53 and 54 at the two ends of the piston 22 and movement of the washers 45 and 46, both always moving in the same direction, tends to open one port, such as 53, while closing the opposite port, such as 54. In such action of the washers 45 and 46, both valves 24 and 25 which are constantly in contact with the washers necessarily move, one being positively contacted and the other because of the urge of the central spring 16. As the washer 46 moves to close port 53, it simultaneously moves valve 25. Valve 24, being spring pressed, moves in the same direction following washer 45. The rack teeth 50 drive the teeth of pinion 58 on power shaft 59.

The operation of the ports as previously described is as follows: The hydraulic fluid, preferably a lubricating oil, enters the cylinder portion 10 of the steering gear housing through fitting 18, port 20 and passes into the oil spaces 28 and 29 on the two sides of the axially movable piston 22. When the shaft 30 is at rest in neutral or straight ahead position the hydraulic oil flows simultaneously past both solid valves 24 and 25, through spaces 28 and 29, out ports 54—51 and 53—52 into the reservoir space 17. Here the slight excess of oil is stored until it is picked up by suction port 60 and returned through fitting 19 and a hydraulic line, not shown, to the main pump 12 which, in turn, discharges the hydraulic fluid to the fitting 18 through a second hydraulic line, not shown. This oil continues to circulate at very low pressure provided that shaft 30 is not rotated. Rotation of this actuating shaft in either direction forces one or the other of the non-rotating washers 45 or 46 toward the proximate end of piston 22. To clarify the description of the operation, we will assume that shaft 30 has been turned because of a movement of the steering wheel to execute a right turn. In such a case, port 53—52 is closed by the movement of washer 46 and valve 25 opens its port from groove 21 still farther. Port 54—51 is opened farther as washer 45 moves away from it and valve 24 closes port 26 as washer 45 tends to move away from it but valve 24 follows because of the urge of spring 16. Pressure is thus built up in the space 29 (port 53 being closed) and has to be relieved in the opposite end space 28 and this building up of pressure continues as long as shaft 30 is rotated in the same direction, that is, to make the right turn. As soon as the turning movement ceases, the piston 22 will again be centered, relieving the pressure in space 29 by opening port 53—52 and moving valve 24 so that the oil once more may circulate at a low pressure through both of the end oil spaces 28 and 29.

In case of hydraulic failure or should an attempt be made to make too sharp a turn at low engine speed, or where the road wheels transfer a severe shock to the vertical power shaft 59 and pinion 58, the washers 45 and 46 will actually touch the piston. Thus, when a hydraulic failure occurs, the washer 46, assuming a right turn is being made, would make firm contact with the piston 22 and the steering would then be mechanical. There would be no building up of pressure in the oil space 28 because under these conditions the port 54—51 would be open.

Referring now to Figure 3, the open top of portion 11 of the housing, which contains the reservoir 17, is closed by a housing cover 63 preferably having a plug breather 64. The pinion 58 is splined to the shaft 59 which carries at its lower end mechanism of any desired type 65 so that the shaft 59 carries the radial motion of steering to the steering arm (not shown) which in turn connects by means of drag links or tie rods to the articulated ground wheels. The previously mentioned means for preventing the piston 22 from rotating with shaft 30 includes a longitudinal groove 67 cut into the piston 22 and a roller 68 fitting this groove fairly closely, being mounted on a roller pin having a head 69.

The method of adjustment to take up for manufacturing discrepancies and to change the steering ratio by altering the lead on rotatable adjusting shaft 30 and the two washers 45 and 46 is best seen in Figures 6, 7 and 8. The piston 22 has two openings 70 and 71 each at 75° from the center line of ports 52—53. These openings are each provided with a threaded portion 75 into which a roll pin 76 is mounted, such pin engaging any chosen one of six equispaced holes such as 78 in washer 46. At the other end of the piston the structure is the same except that there are only four equispaced holes 78 in washer 45. As the single pin 76 may be placed in either hole 70 or 71, consequently with a one inch lead on the screw threads of rotatable adjusting shaft 30, the smallest adjustment between the two washers is forty-two thousandths of an inch which is the minimum axial backlash permitted, the maximum being eighty-three thousandths. This provides a mechanical backlash of just a few inches on the periphery of the steering wheel, which is commercially acceptable, especially when we bear in mind that there is no backlash at all when the pump is running and it is not necessary to bring either washer firmly against the piston before the hydraulic power begins to develop. When the washer does touch the piston, which is very rare in actual practice, the washers mechanically assist the hydraulic fluid in positioning the piston as previously stated. The holes 78 in the two washers are so positioned that these holes which are to receive the pin 76, one for each washer, are never in alignment with the portions of ports 53 and 54 which are parallel to the axis of the piston.

This steering gear, while initially designed for tractor use, is equally suited for use in road graders, loggers, trucks of all kinds, etc., and may be applied to passenger cars and boat steering devices.

What I claim is:

1. Power steering mechanism for a vehicle, comprising a threaded actuating shaft adapted to be connected to rotate with the steering wheel of the vehicle, means for holding the shaft against axial movement, a power shaft having a pinion, a piston having a rack meshing with the pinion and having a passageway at each end, axially moving non-rotating washers having threaded engagement with the actuating shaft at each end to open and close said passageways, and hydraulic means to force fluid through said passageways to move the piston to rotate the power shaft when the actuating shaft is rotated.

2. The mechanism of claim 1 in which the washers are locked at a fixed distance apart by means carried in part by the piston and in part by the washers, said means being adjustable to vary said distance by incremental amounts.

3. The mechanism of claim 1 in which the means for preventing rotation of the washers includes pins carried by the piston in a selected one of a plurality of angular positions, and fitting in a selected hole of a plurality of holes in each washer, the number of holes in the two washers differing in number by one.

4. The mechanism of claim 3 in which the piston has three angular positions for the pin at one end and two angular positions at the other end; one washer has five holes and the other washer has a greater number of holes.

5. Power steering mechanism for a vehicle, comprising a body including a reservoir, a cylinder, and bearings for a power steering shaft; a piston slidable in said cylinder, having a smooth central bore therethrough, a second smooth bore parallel thereto, a passageway at each end leading from the cylinder ends to the reservoir, and a rack at one side of the piston; a power shaft in said bearings and having a pinion driven by said rack; an actuating shaft journaled in said body having a central portion snugly fitting the central bore and having on each side thereof a threaded portion within the cylinder, valve means in the second smooth bore to open or close communication to the cylinder spaces at each end of the piston, a washer threaded to the actuating shaft at each side of the central portion to open and close said passageways and simultaneously to engage the valve means, and means for holding the washers against rotation.

6. The mechanism of claim 5 in which the means for holding the washers against movement is adjustable to vary the distance apart of the washers and the valve means includes the two valves spring-pressed apart.

7. The mechanism of claim 6 in which the valve opening its passageway is constantly in contact with the proximate washer when the other valve has closed its proximate passageway and its proximate washer has moved away.

8. Power steering mechanism for a vehicle, comprising a threaded actuating shaft adapted to be connected to rotate with the steering wheel of the vehicle, means for holding the shaft against axial movement, a power shaft having a pinion, a piston having a rack meshing with the pinion and having a passageway at each end, axially moving non-rotating washers having threaded engagement with the actuating shaft at each end of the piston selectively to open or close either of said passageways while closing or opening the other passageway, and means within the piston controled by said washers for distributing fluid to one side of the piston to move the piston toward the washer opening its proximate passageway.

9. The mechanism of claim 8 in which the actuating shaft passes centrally through the piston.

10. The mechanism of claim 9 in which the passageways both discharge to the rack and pinion contact and each has a portion parallel to the axis of the piston.

11. Power steering mechanism for a tractor comprising a body including a reservoir, a cylinder, and a bore to receive a vertically positioned power steering shaft; a shaft in said bore and carrying at its top a pinion; a piston slidably movable in said cylinder, having a smooth central bore completely therethrough, a second smooth bore of appreciably less diameter parallel to the first bore, a passageway at each end of the cylinder leading from the cylinder to the reservoir and a rack at the side of the piston opposite the smaller bore to mesh with said pinion; an actuating shaft journaled in said body having a relatively small smooth central portion snugly fitting the central bore and being threaded at each side of said central portion, a nut having threaded engagement with the actuating shaft and located proximate one end of the cylinder, a pair of valves in the second smooth bore to establish and to prevent communication between the spaces within the cylinder at each end of the piston, said washers each engaging one of the valves whereby to establish such communication and to force the other of the two valves into contact with the other washer, means for positioning each of the two washers independently of the other a chosen distance from the proximate end of the piston and means for discharging lubricating oil under pressure to the second and smaller bore in the piston whereby to admit fluid to one side or the other of the cylinder as the washers are moved by rotation of the actuating shaft.

References Cited in the file of this patent
UNITED STATES PATENTS 1,937,485    Davis  ------------------ Nov. 28, 1933